(No Model.)
J. J. SUCKERT.
METHOD OF AND APPARATUS FOR COMPRESSING AND LIQUEFYING GASES AND PRODUCING REFRIGERATION.
No. 302,294. Patented July 22, 1884.
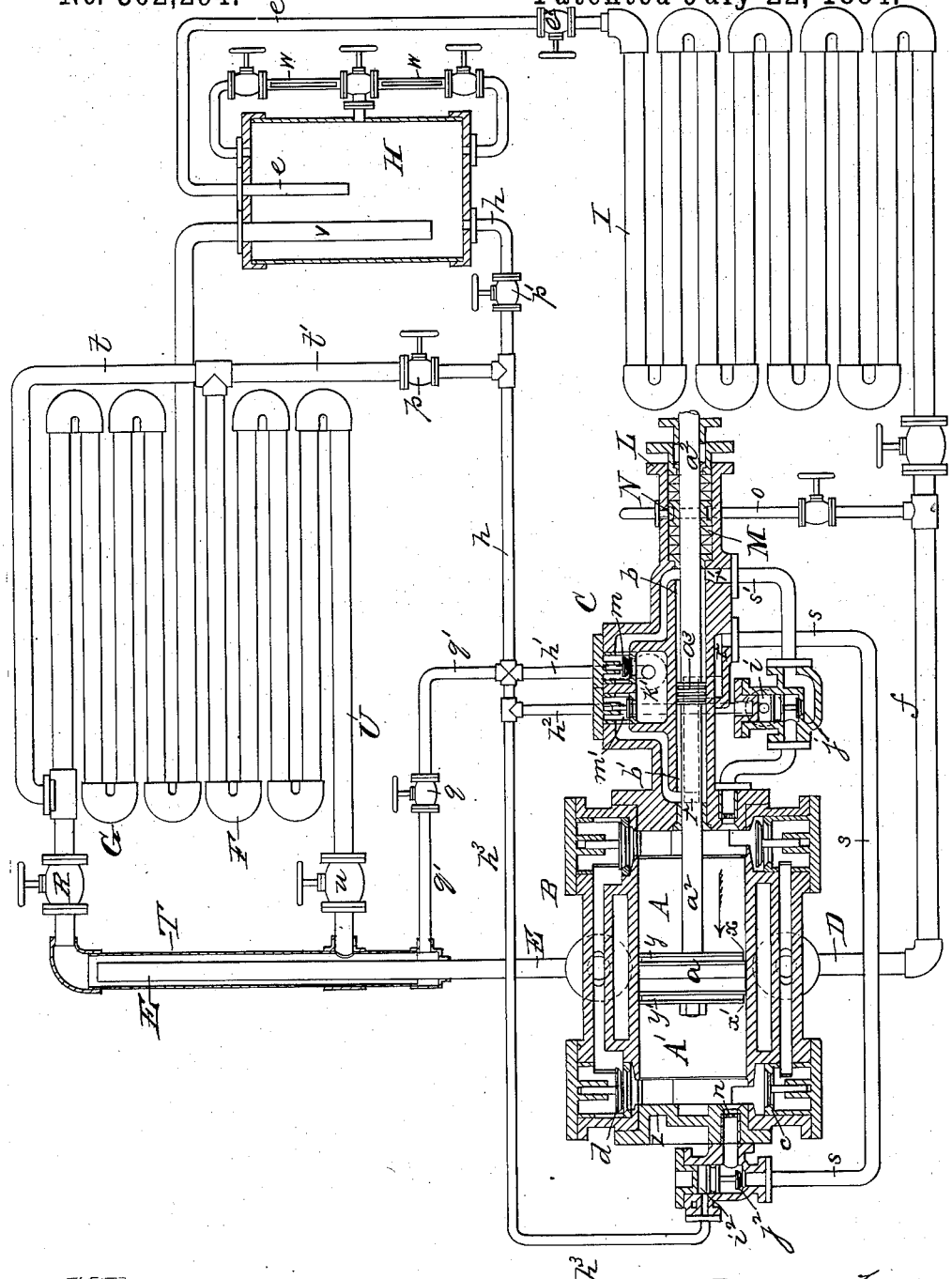
Witnesses.
Robt. Rice
James E. Warner
Inventor
Julius J. Suckert
By his Atty.
W. L. Bennem

UNITED STATES PATENT OFFICE.

JULIUS J. SUCKERT, OF RIDGEWOOD, NEW JERSEY.

METHOD OF AND APPARATUS FOR COMPRESSING AND LIQUEFYING GASES AND PRODUCING REFRIGERATION.

SPECIFICATION forming part of Letters Patent No. 302,294, dated July 22, 1884.

Application filed December 13, 1883. (No model.)

*To all whom it may concern:*

Be it known that I, JULIUS J. SUCKERT, a citizen of the United States, residing at Ridgewood, in the county of Bergen and State of New Jersey, have invented new and useful Improvements in Method of and Apparatus for Compressing and Liquefying Gases and Producing Refrigeration; and I do hereby declare that the following is a full, clear, and exact description of the invention, which will enable others skilled in the art to which it appertains to make and use the same.

Heretofore those using a sealing or lubricating liquid for sealing the piston and valves of a compressor and for lubricating its movable parts have either introduced such liquid into the compressor through its suction-inlets entirely free from gaseous pressure, or at a pressure not exceeding the pressure of the gas entering the suction or inlet valve of the compressor, or the liquid has been introduced at the liquefying pressure of the gas into a chamber or pipe comparatively free from pressure, or wherein the pressure is not in excess of that of the gas on the suction side of the machine, and where an equalization of pressures takes place before the liquid is introduced into the compression-chamber. In consequence of the reduction of pressure, the gas absorbed by the liquid at a higher pressure, escapes from it, necessitating the recompression of the escaped gas without its having performed work; therefore such an apparatus fails to perform its maximum work.

The object of this invention is to discharge from a gas-compressor a greater quantity of gas at each stroke of the piston than has hitherto been accomplished; and to utilize the expansion or vaporization of the gas or liquefied gas with which the sealing or lubricating liquid is charged for the absorption of the heat of compression, or a part thereof, thereby reducing the work of compression; and to diminish the quantity of liquid required for abstracting the heat of compression; and to avoid the loss of efficiency caused by allowing the gas with which the sealing or lubricating liquid is charged to escape to the suction or expansion side of the apparatus or into a chamber of the compressor before it has been supplied with its full complement of gas, and in this way not only lose the cooling effect which may be produced by the vaporization of the gas released from the sealing or lubricating liquid when injected during the act of compression, but also the loss occasioned by being compelled to recompress the gas escaping from the sealing or lubricating liquid without its having performed work. This loss of efficiency, caused by the escape of gas from the sealing or lubricating liquid, increases as the pressure to which the gas is compressed increases, for the volume of gas absorbed by the sealing or lubricating liquid increases directly with the pressure exerted upon it.

The introduction of a sealing or lubricating liquid has hitherto been attained only at considerable loss in efficiency, which is indifferently shown by an indicator diagram or card taken from a compressor using such lubricating-liquid, but becomes plainly apparent when the actual quantity of gas compressed and liquefied is found by weight or computed by volume, which shows the loss of efficiency to be from thirty to fifty per cent. A loss of this nature can only be avoided by using a sealing or lubricating liquid charged with gas or liquefied gas under a pressure exceeding that of the gas entering the compressor to be compressed, and by injecting such lubricating-liquid so charged with gas into the compressor during the act of compression, or after the compressor has received its full complement of gas. By this means, no matter what amount of gas or liquefied gas the sealing or lubricating liquid may contain prior to its introduction into the compressor, if its pressure be at all in excess of the pressure of the gas on the suction side, the percentage of gas entering the compressor and discharged therefrom will be increased above that of all other systems wherein a sealing or lubricating liquid is used in proportion as the amount of gas which the lubricant contains under a pressure is in excess of the pressure on the suction side. To make this more apparent, I will state that the primary object in introducing a liquid into a compression-pump was to seal the valves and fill the waste spaces of the pump. The secondary object was the lubrication of the working parts. The volume of liquid used in the first-known case of this kind was large, and the result was that the liquid absorbed so great a quantity of gas under the pressure exerted that the pumps were abandoned as impractical. Similar attempts have been made since and have also been abandoned, for the same reason, that the liquid absorbed such a large quantity of gas during the act of compression that upon the return-stroke of the piston and a reduction of the pressure the gas escaping from the liquid into the chamber of the compressor entirely filled it, and under sufficient tension to prevent the gas on the suction side from entering the pump. The result was a failure to pump and discharge the gas. The quantity of this liquid was then reduced with more satisfactory results. At this period the knowledge attending the compression of gases had reached a point where engineers could clearly demonstrate that the heat generated by the compression of a gaseous body, if not abstracted, resulted in a loss of power in consequence of the expansion of the gas by the heat developed during compression, and this was clearly shown by applying an indicator to the compressor. The cards taken made it apparent that a gas being compressed without means of abstracting the heat followed the adiabatic instead of the isothermic curve. Means were then employed for abstracting the heat of compression by circulating and cooling the sealing and lubricating liquid, and by injecting a quantity of such cooled liquid into a chamber or pipe connected with the suction side of the compressor at each stroke of the compressor; but it was found necessary to do this without exposure to the atmosphere, to avoid the loss of expensive gas, except in the case of the compression of atmospheric air. Thus far the improvements were a great gain; but even with the improved system of introducing a smaller quantity of cooled lubricating-liquid and circulating it without exposure to the atmosphere a great loss still exists, which, in spite of the experience gained by former investigators, has not heretofore been overcome.

Before proceeding with further explanation I will state that the compression of gases under ordinary conditions is subject to the established law of Mariotte, except so far as this law may be modified by that of Gay-Lussac, and it will make no special difference what the initial and final pressures of the gas to be compressed are, as the volume of the gas will always be inversely as the pressure, and vice versa. Another important thing to be remembered is that liquids absorb more or less gas, according to the pressure and temperature to which they are exposed. For instance, water will absorb seven hundred times its volume of ammonia-gas at atmospheric pressure and at 60° Fahrenheit; other liquids a proportionate amount, according to their affinity for the gas with which they may be in contact.

As a matter of convenience, and to make this statement clear, I will assume that the compressor contains one thousand cubic inches of gas which is admitted therein at atmospheric pressure, or fifteen pounds per square inch. For this proportion of gas in the compressor, say I admit twenty cubic inches of sealing or lubricating liquid which will absorb more than fifty cubic inches of gas at the pressure of the atmosphere. If this liquid be exposed to gas or liquefied gas under a pressure of one hundred and fifty pounds per square inch, it will, following a well-known physical law, absorb fifty cubic inches of gas at this pressure; but this volume of gas would expand to five hundred cubic inches if the pressure were reduced to that of the atmosphere. Now, it will be apparent, if the lubricant has been exposed to or charged with gas, as above described, and then discharged into a tank or receptacle which is under the working pressure of the pump, that upon its reintroduction into a compressor or the pipes or chambers connecting therewith wherein a reduced pressure exists only equal in the instance given to that of the suction side, four hundred and fifty cubic inches of the gas will escape from the liquid, leaving fifty cubic inches still absorbed. There must consequently be an absolute waste of power and time required to recompress the four hundred and fifty cubic inches of gas escaping from the lubricating-liquid discharged from the compressor at each stroke of its piston. Therefore, instead of discharging one thousand cubic inches of gas at each stroke of the compressor, estimating it at atmospheric pressure, but five hundred and fifty cubic inches are discharged in a utilizable form, the remaining four hundred and fifty cubic inches being retained by the lubricating-liquid and permitted to escape to the suction side of the machine without performing work, which in the above example would result in a loss of efficiency of forty-five per cent. To attain this result, it is assumed in the foregoing statement that the same temperatures and the same conditions exist throughout the operation. Practically these vary, and such variation would vary the above figures; but the final result approximates to that attained in actual practice. By introducing the sealing or lubricating liquid charged with gas or liquefied gas under the working pressure according to the present improvements, the above loss is entirely obviated. In addition thereto, another advantage is gained by utilizing the heat-absorbing qualities of the gas dissolved in the lubricating-liquid by its escape from the liquid when exposed to a reduced pressure, which will be the case when the liquid is introduced charged with gas under the working pressure into the compressor at the beginning or during a portion of the compression-stroke, and as the pressure within the compressor increases during compression, a point will be reached when the pressure is equal to the pressure at which the liquid was charged with gas—i. e., the working pressure. Now, if no increase of temperature occurs above that at which the liquid is charged, no gas will escape; but practically this is not the fact. The temperature increases to some extent. Therefore, even at this point, the increase in temperature still continues to expel some gas from the lubricating-liquid, whereby the heat developed continues to be taken up. By injecting the lubricating-liquid charged with gas in the manner above stated, more heat will be abstracted by the same volume of lubricating-liquid than by the old method, or smaller volume of the lubricating liquid charged with gas will be sufficient to abstract the greater portion of the heat developed by compression; and, again, the proportionate amount of heat abstracted by this method will cause the compression-curve to approach closer to the isothermic than has hitherto been effected, showing a resulting economy in power. It is thus evident that a great advantage is gained over the old system by introducing the sealing or lubricating-liquid into the chamber of a single-acting pump having its full complement of gas when the said sealing or lubricating liquid is charged with gas or liquefied gas, and both the lubricating-liquid and gas are introduced under a pressure equal to the liquefying-pressure of the gas, or a pressure in excess of that of the gas entering the suction-inlet of the compressor to be compressed; but the gain is greater when the liquid is injected during the act of compression. The cooling action effected by the expulsion or vaporization of the gas or liquefied gas from the sealing or lubricating-liquid, and the consequent absorption thereby of a portion of the heat generated during the act of compression, can be increased or diminished by using different sealing or lubricating agents which have more or less affinity or absorbing capacity for the gas or liquefied gas with which they come in contact. The absorption of the gas by the sealing or lubricating liquid can be increased by cooling the lubricating or sealing liquid in contact with the gas, or the quantity of gas absorbed can be diminished by simply returning the lubricating or sealing liquid to the compressor without cooling. Again, the quantity of sealing or lubricating liquid can be injected into the compressor in predetermined quantities by means of a pump or other device; or it may be allowed to flow into the compressor by the pressure exerted by a column of the liquid, and be controlled by means of suitable valves which may be opened and closed automatically.

To these ends the invention consists in the process by which the efficiency of a gas-compressing apparatus is increased, which process consists in circulating a sealing or lubricating liquid and exposing the said liquid to or charging it with gas or liquefied gas under a pressure exceeding the pressure of the gas entering the compressor to be compressed, and then without exposure to the atmosphere, and then injecting the said sealing or lubricating liquid while so charged with gas and under such pressure into a chamber of a gas-compressor supplied with its full complement of gas, either prior to or during the act of compression, as will hereinafter appear.

The invention also consists in the process by which the efficiency of a gas-compressing apparatus is increased, which process consists in circulating and cooling a sealing or lubricating liquid and exposing the said liquid to or charging it with gas or liquefied gas under a pressure exceeding the pressure of the gas entering the compressor to be compressed and without exposure to the atmosphere, and then injecting such sealing or lubricating liquid while so charged with gas and under such pressure, in predetermined quantities, into a chamber of a gas-compressor charged with its full complement of gas, either prior to or during the act of compression, and then absorbing the heat of compression or a part thereof within the compressor by the release and expansion of the gas held by the sealing and lubricating liquid when injected, as will hereinafter appear.

The invention also consists in the process by which the efficiency of a gas-compressing apparatus is increased, which process consists in circulating and cooling a sealing or lubricating liquid without exposure to the atmosphere, exposing the said liquid to or charging it with gas or liquefied gas under a pressure exceeding the pressure of the gas entering the compressor to be compressed, and then injecting such sealing or lubricating liquid while so charged with gas and without reducing its pressure into a chamber of a gas-compressor supplied with its full complement of gas, either prior to or during the act of compression, as will hereinafter appear.

The invention also consists in an improved gas-compressor having a peculiar construction and arrangement of valves and parts, whereby the said valves are held in place and a sealing or lubricating liquid under pressure is prevented from entering the compressing-cylinder during the suction-stroke of the compressor-piston, as will hereinafter appear.

The invention also consists in an improved gas-compressor having a peculiar construction and arrangement of valves and parts, whereby the said valves are held in place and a sealing or lubricating liquid under pressure is prevented from entering the compression-cylinder during the suction-stroke of the compression-piston, but which admits the said liquid to the compression-cylinders during the act of compression, as will hereinafter appear.

The invention also consists in a gas-compressor having a liquid-pump in combination therewith, the whole constructed and arranged so that the said compressor, when connected with a gas-condenser and a liquid-reservoir, has its valves liquid-sealed, and the piston-rod orifice in the head of the compressor is sealed upon its outer side by a liquid under pressure, as will hereinafter appear.

The invention also consists of the combination of a gas-compresser and auxiliary pump, when constructed and arranged so that the piston of the compressor and the piston of the auxiliary pump shall have a common piston-rod, and the piston-rod and its orifice in the head of the compressor is inclosed in a chamber, whereby it may be sealed by a liquid under pressure, as will hereinafter appear.

The invention also consists of the combination of the several parts of the gas-compressor and the conduits and connections shown and described, as will hereinafter appear; and the invention also consists in combinations of mechanisms and devices shown, described, or used for effecting the desired process, as will hereinafter appear One practical embodiment of these improvements is illustrated in the accompanying drawing, the same showing an elevation, partly in section, of an apparatus which will now be fully explained.

A and A′ are the compression-chambers of a double-acting compressor, B.

$a$ is the main piston of the compressor, having a long piston-rod, $a^2$, upon which is secured a smaller piston, $a^3$, which moves within the chambers $b$ and $b'$ of an auxiliary pump, C, that is used to inject the sealing or lubricating liquid into the chambers A and A′ of the compressor. This pump, when charged with its supply of lubricating-liquid, forms a seal under pressure and prevents gas from leaking from the compressor during the act of compression.

$y$ and $y'$ are grooves entirely surrounding the piston $a$, and communicating with the chambers A and A′ by means of the orifices $x$ and $x'$, to serve as a receptacle for a lubricating-liquid which prevents the gas from slipping past the piston during the act of compression. The pistons, as shown in the drawing, are supposed to be moving in the direction pointed by the arrow.

$c$ is the gas-inlet valve of the chamber A′, shown as closed, and $c'$ is the gas-inlet valve of the chamber A, shown as open.

$d$ is the gas-discharge valve of the chamber A′, shown as open, and $d'$ is the gas-discharge valve of the chamber A, shown as closed. Like valves—as the companion, induction, and eduction valves—are connected by a chamber upon that side of the pump where the said valves are located, one of which chambers—namely, that connecting the induction-valves $c$ and $c'$—has communicating with it a large suction or gas-supply pipe, D, while the other chamber—namely, that connecting the eduction-valves $d$ and $d'$—communicates with a large discharge-pipe, E, and the latter connects with the cooler F and condenser G.

H is the reservoir for receiving the sealing or lubricating liquid and the liquefied gas, which are kept continuously under a pressure equal to that of the working pressure of the apparatus.

I is an expansion coil for cooling, wherein the liquefied gas is expanded for the absorption of heat. The liquefied gas is admitted from the reservoir H to the said coil through the pipe $e$ and stop-cock $e'$ $f$ is the pipe conveying the expanded gas from the expansion-coil back to the compressor, and connects with or forms part of the main suction or return gas pipe D.

$h$ is a pipe connecting with the reservoir H, to supply the auxiliary pump with lubricating or sealing liquid through the pipe $h'$. It also connects with a pipe, $h^2$, which supplies the piston-chamber $i$ of the valve $j$ with a column of liquid which is under the working pressure of the machine, and as the piston of the valve $j$ has a greater area then its valve-seat, and both are under the same working pressure, such pressure insures the seating of the valve $j$, and holds it in position when the main piston $a$ is moving in the direction pointed by the arrow, thereby preventing the liquid entering the chamber $b$ of the auxiliary pump C under the working pressure from forcing its way through the valve $j$ into the chamber A upon the suction-stroke of the compressor. The pipe $h$ also connects through a pipe, $h^3$, with the chamber $i^2$ at the discharge-valve $j^2$, and supplies said chamber with a column of the lubricating-liquid under pressure. Both discharge-valves $j$ and $j^2$ of the auxiliary pump C have stems or rods which connect with pistons of a larger area than the seats of the valves. These pistons move in the chambers $i$ and $i^2$, and each having upon its upper surface a column of the lubricating-liquid under the working pressure of the machine, they will by reason of this excess of area under pressure be firmly held to their seats during the suction-strokes of the piston $a$, thus preventing the introduction of the sealing or lubricating liquid into each chamber of the compressor until the said chamber is charged with its full complement of gas and the act of compression begins. The pipe $h$ has a continuation, $h^3$, that communicates with the piston-chamber $i^2$ of the valve $j^2$ and supplies a column of lubricating-liquid under the working pressure of the machine, and which acts in a similar manner upon this valve as upon the valve $j$ under like conditions; but it will be observed that the valve $j^2$ is held open during the act of compression, or while the piston $a$ is moving in the direction pointed by the arrow, in the following manner: The sealing or lubricating liquid passes under pressure either from the reservoir H or the pipes $t'$ or $q'$ through the pipes $h$ and $h'$ into the receiving-chamber $k'$, below the suction valves $m$ and $m'$, through which it passes, alternately, with the reciprocating action of the piston to the chambers $b$ and $b'$, thence through the port $r'$ and the port $r$ (shown in part by dotted lines) to the corresponding connecting-pipes $s'$ and $s$ to the discharge-valves $j$ and $j^2$.

As shown in the drawing, the auxiliary pump-piston $a^3$ is exampled as moving in the direction pointed by the arrow, and the sealing or lubricating liquid is entering the valve $m$ and its corresponding port into the chamber $b$. The liquid contained in the chamber $b'$ is being forced through the port $r$, the connecting-pipe $s$, the discharge-valve $j^2$, and the apertures at $n$ into the chamber A' in the form of jets or spray during the act of compression, the pressure upon the liquid discharged being sufficiently in excess of the working pressure to overcome the resistance exerted by the difference in the area of the discharge-valve $j^2$ and its piston $i^2$. This excess of pressure is also exerted upon the suction-valve $m'$, thereby keeping it closed during the discharge of the liquid from the chamber $b'$; but it will be apparent that the sealing or lubricating liquid cannot enter the chambers of the compressing-pump B until the pump has received its full complement of gas and the act of compression begins.

The auxiliary pump C is provided with a stuffing-box, L, which is supplied with suitable packing, M, and has a chamber, N, formed by a metal ring or flanged ferrule, by means of which the sealing or lubricating liquid that may pass the packing will escape through the pipe $o$ into a pipe, $f$, that communicates with the suction side of the apparatus. In case gas should be forced by pressure through the auxiliary pump C, it could find its way back into the system and not be forced out around the piston-rod into the atmosphere through the pipe $o$. Another advantage in having the chamber N connected with the expansion or return pipe $f$ is that sometimes, when working the pump with great rapidity, it becomes very warm, particularly its piston-rod, owing to tight packing, and in such cases the cold return-gas can be introduced into the pump by opening the cock in the pipe $o$, and its parts thus be cooled. The continuation of the discharge-pipe E is surrounded by a casing, T, of greater diameter than the pipe, and having its lower end closed by a bushing or reducing closure around the pipe E, forming a tight joint. Its upper end can communicate with the condenser G, if necessary, by opening the valve R. The pipe U, having the stop-cock $u$, conveys the gas from the annular space formed by the casing T, surrounding the pipe E, to the vertical cooler F, thence through the coils of said cooler, and discharges it into the vertical pipe $t$, while the sealing or lubricating liquid separated at this point passes through the pipe $t'$ and valve $p$ to the liquid-supply pipe $h$. The gas, with such portions of the sealing or lubricating liquid as may not be condensed, is driven upward through the pipe $t$ into the coils of the condenser G. Water passing over these coils in thin streams absorbs the heat developed by the compression of the gas and the vaporized sealing or lubricating liquid, causing both to liquefy and follow the course of the coil and empty through the pipe $v$ into the liquid-reservoir H, where, by reason of their different specific gravities, the sealing or lubricating liquid, being heavier, will settle to the bottom, and may be drawn through the pipe $h$ and valve $p'$, and the liquefied gas be drawn from the top through the pipe $e$. If the lubricant is lighter than the gas, an arrangement of parts may be readily made to reverse this part of the operation. The sealing or lubricating liquid separating in the annular space formed between the pipe E and casing T may be drawn, prior to its entrance into the cooler F, through the pipe $q'$ into the pipe $h'$ by opening the valve $q$, and be thus supplied warm to the auxiliary pump C, if occasion should so require. A gage, $w$, may be provided to show the quantity of the liquids in the liquid-reservoir H.

Before describing the operation I will designate two parts of the apparatus by the appellations usually applied in practice to them. From the cock $c'$ in the pipe $e$ to the inlet-valves of the compressor is known as either the "expansion," "suction," or "return" side of the apparatus, while the remaining portion of the apparatus is called the "pressure" side.

Having described the various parts of the apparatus, it may be observed that any volatile liquid or gas may be used; but while ammonia is preferred, sulphur dioxide, methylamine, carbonic acid, &c., may be employed, while the sealing or lubricating liquid may be oil, glycerine, or any other suitable to the purpose of sealing or lubricating.

The apparatus being fully provided with the necessary gas and the proper supply of sealing or lubricating liquid, the operation will be as follows: Upon the movement of the main piston in the reverse direction to that indicated by the arrow, the chamber A' is charged with its full complement of gas, which enters the chamber by the lifting of the suction-valve $c$. The piston $a^3$ of the auxiliary pump, moving simultaneously in the same direction, draws the sealing or lubricating liquid through the entrance-valve $m'$ and fills the chamber $b'$, the port $r$, and the connecting-pipe $s$. The stroke being now reversed, both pistons move in the contrary direction, or in that indicated by the arrow, and the piston $a$ compresses the gas in the chamber A', and the piston $a^3$ forces the sealing or lubricating liquid from the chamber $b'$ through its outlet-port $r$ and connecting-pipe $s$ with sufficient pressure to open the discharge-valve $j^2$, notwithstanding the excess of area of the piston of that valve, and injects the sealing or lubricating liquid through the apertures at $n$ in the form of spray or a series of jets into the compression-chamber A', the discharge continuing as long as the piston $a^3$ moves in such direction. The sealing or lubricating liquid charged with gas or liquified gas under pressure, upon its entrance into the compression-chamber A' at a period when the pressure within said chamber is below that at which the said liquid was charged, parts with a portion of the gas or liquefied gas held in solution, or with which it is charged, thereby reducing its own temperature as well as that of the gas being compressed. As the main piston a advances and the pressure within the compression-chamber A approaches that at which the sealing or lubricating liquid was charged with gas or liquefied gas, the heat developed by compression is in great part spent in increasing the temperature of the sealing or lubricating liquid and the absorbed gas or liquefied gas injected with it, thereby expelling a portion of the latter, and by this means the power required to perform the act of compression is materially reduced. The pressure within the compression-chamber A' having in the meantime reached that in the condenser G and the chamber leading from the discharge-valve, the discharge-valve d is opened and the gas escapes through the discharge-pipe E and the cooler F to the condenser G, where it is liquefied and flows into the reservoir H, and is ready for any use to which it may be desirable to apply it. The sealing or lubricating liquid is partially discharged in the form of foam or vapor with the gas. That remaining in the chamber A' fills the waste spaces formed between the valve $j^2$, the suction-valve c, the discharge-valve d, the compressor-head Z, and the piston a. Any excess thereof being forced past the discharge-valve d, effectually seals the same when it closes, and is carried by the gas with that which has already passed off in the form of foam or vapor through the discharge-pipe E, and either settles in the annular space formed by the pipe E and casing T, or it passes into the cooler F, and thence flows into the pipe $t'$, or it is carried through the pipe t and the condenser G to the liquid-reservoir H. A portion of the sealing or lubricating liquid also enters the orifice $x'$, and fills the groove $y'$ surrounding the piston, and seals the same, and, if a lubricating-liquid is used, also lubricates the piston and other moving parts. Upon the return-stroke of both pistons the same operation is repeated in chamber A of the compressor, and in chamber b and port $r'$ of the auxiliary pump, and in pipe $s'$ and discharge-valve j. Assuming that the return-stroke is being performed, the discharge-valve d of the chamber A' immediately closes and is sealed by the liquid covering it, the suction-valve c is opened, and gas enters the chamber through the liquid covering the suction-valve c. The pressure required to open the valve $j^2$ being in excess of that exerted by the piston $i^2$, it follows that upon the return-stroke of the auxiliary-pump piston $a^2$ the valve is relieved of this excess of pressure, and is immediately closed by the pressure of the liquid or liquid and gas exerted upon the piston $i^2$. At the same moment the inlet or suction valve $m'$ of the auxiliary pump again opens, and the operation as previously described is repeated. When the compressor is operating, the sealing or lubricating liquid and the gas are usually circulating under the pressure exerted by the machine, designated here as the "working pressure," which will average, say, about one hundred and fifty pounds to the square inch, according to the conditions; but it is frequently lower, and at times is much higher, depending upon the temperature of the water used for condensing. In consequence of the circulation of the sealing or lubricating liquid and the gas or liquefied gas in the presence of each other under the working pressure, the sealing or lubricating liquid dissolves a quantity of the gas or becomes charged with it, and always in proportion to its temperature and the pressure exerted upon it. Again, with this apparatus it is intended that while the lubricating-liquid and gas or liquefied gas are combined, which is throughout the pressure side of the machine, they shall be under the working pressure, except during that portion of time when the gas in said liquid is expanding in the cylinder of the compressor during the act of compression, or at a time when something outside of the usual order occurs. Consequently, when the lubricating or sealing liquid is introduced into the compressor, it is always charged with gas or liquefied gas under a pressure in excess of the pressure of the gas entering the compressor to be compressed. In case the pump is used for producing a vacuum, or the expanding gas from the coil I is returned with sufficient rapidity to congeal the sealing or lubricating liquid within the pump, it may be necessary to use the warm sealing or lubricating liquid accumulating in the annular space between the pipe E and casing T, which can be done by opening the valve q, thus allowing the liquid to flow through the pipe $q'$ to the pipe $h'$, and thence to the auxiliary pump; or it may be necessary to use the liquid passing through the cooler F and accumulating in the pipe $t'$, which may be done by opening the valve p; or the liquid may be used from the reservoir H by opening the valve $p'$ in pipe h. By properly regulating the quantity of sealing or lubricating liquid entering the auxiliary pump C by means of the valves q, p, or $p'$, the heat of compression can be increased or diminished at will; or the sealing or lubricating liquid can be injected into the compression-chambers A and A' during any portion of the compression-stroke. If the auxiliary pump is allowed to fill its chambers b and $b'$ entirely with the sealing or lubricating liquid, the discharge of the same into the compressing-chambers A and A' will be simultaneous with and continuous during the period of compression and the discharge of the compressed gas. By reducing the flow of the sealing or lubricating liquid to the auxiliary pump C by means of the valves q, p, and $p'$, so as to but partially fill the chambers b and $b'$, the sealing or lubricating liquid can be injected into the compression-chambers A and A' after a partial compression of the gas, or when the gas has reached its maximum compression and is being forced through the discharge-outlets of the compressor. Again, assuming that the compressor, when charged with its full complement of gas, contains one thousand cubic inches at atmospheric pressure, and that the lubricating or sealing liquid being injected therein is more fully charged with gas, (owing to the difference in temperature,) then when discharged from the compressor it will appear that at least if not a little more than one thousand cubic inches of the gas discharged from the compressor at each stroke of the piston will be in gaseous form and can be utilized. Thus it will be apparent that by this process nearly as much gas can be compressed at one stroke of the piston as can be compressed by two strokes under other systems previously described, and that the increase of efficiency is of great value in the compression and liquefaction of gases.

As the condenser herein shown forms the subject-matter of another application, no specific claim to the elements of invention which it embodies is herein made; but, Having described my invention, what I claim is—

1. The process by which the efficiency of a gas-compressing apparatus is increased, the same consisting in circulating a sealing or lubricating liquid, exposing the said liquid to or charging it with gas or liquefied gas under a pressure exceeding the pressure of the gas entering the compressor to be compressed, and then injecting the said sealing or lubricating liquid while so charged with gas and under such pressure into a chamber of a gas-compressor supplied with its full complement of gas, either prior to or during the act of compression, all without exposure to the atmosphere, substantially as described.

2. The process by which the efficiency of a gas-compressing apparatus is increased, the same consisting in circulating and cooling a sealing or lubricating liquid, exposing the said liquid to or charging it with gas or liquefied gas under a pressure exceeding the pressure of the gas entering the compressor to be compressed, and then injecting such sealing or lubricating liquid while so charged with gas and under such pressure into a chamber of a gas-compressor supplied with its full complement of gas, either prior to or during the act of compression, all without exposure to the atmosphere, substantially as described.

3. The process by which the efficiency of a gas-compressing apparatus is increased, the same consisting in circulating and cooling a sealing or lubricating liquid, exposing the said liquid to or charging it with gas or liquefied gas under a pressure exceeding the pressure of the gas entering the compressor to be compressed, then injecting such sealing or lubricating liquid while so charged with gas and under such pressure in predetermined quantities into a chamber of a gas-compressor charged with its full complement of gas, and then absorbing the heat of compression, or a part thereof, within the compressor by the release and expansion of the gas held by the sealing or lubricating liquid when injected, all without exposure to the atmosphere, substantially as described.

4. In a gas-compressor, the combination with the piston-rod thereof and an external chamber in which said piston-rod works, of an auxiliary pump provided with suitable valves and connecting-pipes, whereby a sealing or lubricating liquid is introduced into said chamber, and thereby seals said piston-rod, substantially as described.

5. The combination, with a gas-compressor having an external chamber connected with or attached to its head, through which chamber a piston-rod works, and in which a sealing or lubricating liquid is introduced to seal the piston-rod, of an auxiliary pump provided with suitable valves and connecting-pipes, whereby the said liquid is introduced within the compression-chamber of said compressor when fully charged with gas, substantially as described.

6. The combination, with the piston-rod of a gas-compressor, of an auxiliary pump, the liquid chamber whereof operates as a sealing-chamber for the piston-rod of the gas-compressor outside of said compressor, substantially as described.

7. The combination, with a gas-compressor and an auxiliary pump having suitable valves and conduits, whereby a liquid is introduced from said pump into the compressor, of a piston-rod common to both, whereby the liquid moved by the pump seals the piston-rod upon the outer side of the compressor-head, substantially as described.

8. The combination, with a gas-compressor and an auxiliary pump having a piston-rod common to both, of suitable valves and conduits arranged to introduce a liquid from said pump into the compressor, substantially as described.

9. The combination, with a gas-compressor, of an auxiliary pump, the liquid-pumping chamber whereof is constructed, connected, and arranged to form a chamber, in which gas escaping through the piston-rod orifice in the head of the compressor is arrested, substantially as described.

10. The combination, with a gas-compressor, of an auxiliary pump provided with a means of supplying its pumping-chamber with a liquid under the working pressure of the compressor, and arranged to admit the liquid to the chamber of the pump and seal the piston-rod of the compressor under a pressure equal to that exerted by the compressor upon the gas being compressed, substantially as described.

11. The combination, with a gas-compressor having a liquid-sealed piston-rod, of an auxiliary pump which is provided with suitable valves and conduits, whereby a sealing or lubricating liquid is not only introduced from said pump into the compressor and while the same is fully charged with gas, but under a pressure equal to the pressure exerted upon the gas being compressed, substantially as described.

12. The combination, with a gas-compressor having a liquid-sealed piston-rod, of an auxiliary pump which is provided with suitable valves and conduits connecting it with said compressor, and whereby a sealing or lubricating liquid is not only introduced from said pump into the compressor and while the same is fully charged with gas, but under a pressure in excess of the pressure exerted upon the gas being compressed, substantially as described.

13. The combination, with a gas-compressor, of an auxiliary pump provided with suitable valves and conduits connecting it with said compressor, all constructed and operating to inject a sealing or lubricating liquid into a compressing-chamber of a compressor fully charged with gas and under a pressure equal to the pressure of the gas entering the compressor to be compressed, all without exposure to the atmosphere, substantially as described.

14. The combination, with a gas-compressor, of an auxiliary pump provided with suitable valves and conduits connecting it with said compressor, all constructed and operating to introduce a sealing or lubricating liquid into a compressing-chamber of a compressor fully charged with gas and under a pressure in excess of the pressure of the gas entering the compressor to be compressed, substantially as described.

15. The combination, with a gas-compressor, of an auxiliary pump constructed and so arranged that a liquid admitted within a liquid-chamber of said pump operates to first seal the piston-rod of the compressor, and is then discharged into the compressing-cylinder of the gas-compressor when the said compressor has received its full complement of gas, substantially as described.

16. The combination, with a gas-compressor, of an auxiliary pump constructed, connected, and operating to admit a liquid within a chamber of said pump, and thereby seal the piston-rod of the compressor, and then discharge said liquid into a compressing-cylinder of a gas-compressor when the latter is fully charged with gas and during the act of compression, substantially as described.

17. The combination, with a gas-compressor, of an auxiliary pump and connecting-pipes constructed and operating to introduce a fresh supply of cooled liquid within a chamber around the piston-rod outside of the compressor at each stroke of the piston, and seal the piston-rod orifice in the head of the compressor on its outer side, substantially as described.

18. The combination, with a gas-compressor, of an auxiliary pump constructed and operating to continuously interpose a supply of liquid between the head of the compressor and the outer stuffing-box of its piston-rod, substantially as described.

19. The combination, with a gas-compressor, of an auxiliary pump constructed and operating to continuously circulate a fresh supply of sealing or lubricating liquid in the space inclosed—not occupied by the piston-rod of the compressor—between the head of the compressor and the outer stuffing-box encircling the piston-rod of the compressor, substantially as described.

20. The combination, with a gas-compressor, of a double-acting liquid-supplying pump provided with suitable valves and conduits, and constructed, connected, and operating to introduce a sealing or lubricating liquid into a chamber of the gas-compressor when the said compressor is fully charged with gas, substantially as described.

21. The combination, with a double-acting gas-compressor, of a double-acting supplying-pump having suitable valves and conduits, whereby a sealing or lubricating liquid is introduced into a chamber of the gas-compressor when the said compressor is fully charged with gas, substantially as described.

22. A gas-compressor having an inlet-valve for the introduction of a sealing or lubricating liquid into a chamber of said compressor, which valve is provided with a piston of larger diameter and greater area than the seat of said valve, and the said valve is held in its seat by a pressure exerted upon such surface of its piston that is in excess of the pressure, tending to raise the valve from its seat during the suction-stroke of the piston, substantially as described.

23. A gas-compressor having a chamber connected with or attached to the head of the said compressor, wherein a sealing or lubricating liquid seals the piston-rod orifice in the head of said compressor on its outer side under a pressure equal to or in excess of the working pressure of the compressor, in combination with an auxiliary pump provided with suitable valves and connecting-pipes, and constructed and arranged to introduce the said liquid within a compression-chamber of said compressor when the latter is fully charged with gas, substantially as described.

24. The combination, with a gas-compressor, of an auxiliary pump, a liquid-supply chamber, valves controlling the same, and passages leading therefrom to its pumping-chamber, whereby a liquid entering the pump under the working pressure of the compressor operates to raise the valves and alternately supply each end of the pumping-chamber with its charge of liquid upon each stroke of the compressor-piston, substantially as described.

25. A gas-compressor constructed and arranged to admit of the introduction of a sealing or lubricating liquid into a chamber of said compressor when fully charged with gas when the said sealing or lubricating liquid is charged with gas or a liquefied gas at a pressure in excess of the pressure of the gas entering the compressor to be compressed, and which, while under such pressure, is introduced into the said compressor, in combination with a gas-condenser, a reservoir for holding the sealing or lubricating liquid, and intermediate connecting-pipes, substantially as described.

26. A gas-compressor constructed and arranged to admit of the introduction of a sealing or lubricating liquid into a chamber of said compressor when fully charged with gas when the said sealing or lubricating liquid is charged with gas or a liquefied gas at a pressure in excess of the pressure of the gas entering the compressor to be compressed, and which liquid is introduced while under such pressure into the said compressor, in combination with an auxiliary pump, a condenser, a reservoir for holding the sealing or lubricating liquid, and their intermediate connecting-pipes, substantially as described.

27. A gas-compressor constructed and arranged to admit of the introduction of a sealing or lubricating liquid into a chamber of said compressor when fully charged with gas when the said sealing or lubricating liquid is charged with gas or a liquefied gas at a pressure in excess of that of the gas entering the compressor to be compressed, and which is introduced while under such pressure into the said compressor, in combination with a gas-condenser, a reservoir for holding the sealing or lubricating liquid, and a coil of pipes or a chamber wherein the liquefied gas is expanded, and their intermediate connecting-pipes, substantially as described.

28. A gas-compressor constructed and arranged to admit of the introduction of a sealing or lubricating liquid into a chamber of said compressor when fully charged with gas when the said sealing or lubricating liquid is charged with gas or a liquefied gas at a pressure in excess of that of the gas entering the compressor to be compressed, and which is introduced while under such pressure into the said compressor, in combination with a gas-condenser, a reservoir for holding the sealing or lubricating liquid, a liquid-supplying pump, a coil or chamber in which the liquefied gas is expanded, and their intermediate connecting-pipes, substantially as described.

29. A gas-compressor whereof the valves for controlling the introduction of the sealing or lubricating liquid are constructed and operate with relation to the vacuum or compression chamber of said compressor to prevent the sealing or lubricating liquid under pressure from entering the compression-chamber of said compressor during the suction-stroke of the compressor-piston, substantially as described.

30. A gas-compressor whereof the valves for controlling the introduction of the sealing or lubricating liquid are constructed and operate with relation to the vacuum or compression chamber of said compressor to close and prevent the sealing or lubricating liquid under pressure from entering the compressing-chamber of said compressor during the suction-stroke of the compressor-piston, and to open and admit said liquid to the compression-chamber of said compressor during the act of compression, substantially as described.

31. A gas-compressor, in combination with an auxiliary pump provided with suitable valves and connecting-pipes, whereby a sealing or lubricating liquid is introduced within a chamber outside of the cylinder of the compressor, thereby sealing the piston-rod of the compressor, substantially as described.

32. A gas-compressor, in combination with an auxiliary pump provided with suitable valves and connecting-pipes, whereby a sealing or lubricating liquid is introduced within a chamber outside of the cylinder of the compressor, which liquid seals the piston-rod of the compressor under pressure, substantially as described.

33. The combination, with a gas-compressor and a liquid-reservoir, of connecting-pipes and a pressure device, whereby a sealing or lubricating liquid is introduced into the compressor under a pressure in excess of the pressure of the gas entering the compressor to be compressed, substantially as described.

34. The combination, with a gas-compressor and a liquid reservoir, of connecting-pipes and a measuring device operating to determine the quantity of sealing or lubricating liquid introduced within the compressor, substantially as described.

35. A gas-compressor having an outside chamber for sealing its piston-rod with a liquid, a piston-rod sealed under a pressure in excess of the gas entering the compressor, and a measuring device operating to determine the quantity of sealing or lubricating liquid introduced within the compressor, in combination with a liquid-reservoir and connecting-pipes, substantially as described.

36. The gas-compressor B, in combination with the pump C and their conduits or connecting-pipes, all constructed and operating substantially as described.

37. A gas-compressor provided with the valves $j$ and $j'$, which have pistons of greater diameter and greater area than the said valves, the auxiliary pump C, the pipes $s$, $s'$, $h$, $h'$, $h^2$, and $h^3$, the gas-inlet pipe D, and the discharge-pipe E, all in combination, substantially as described.

38. The gas-compressor B, the auxiliary pump C, the pipes $s$, $s'$, $h$, $h'$, $h^2$, and $h^3$, the gas-inlet pipe D, the discharge-pipe E, the casing T, the pipe $q'$, the liquid-reservoir H, a gas-condenser, a cooling-coil for cooling the sealing or lubricating liquid, the stop-cocks $c'$, $p'$, $p$, and $q$, and the intermediate connecting-pipes, all in combination, substantially as described.

39. A gas-compressor, in combination with an auxiliary pump, a condensing-coil, an expansion-coil, and intermediate connecting-pipes, a chamber around the piston-rod in the stuffing-box of the auxiliary pump, and an inlet whereby the partially-expanded gas returning to the compressor to be recompressed may be introduced into the said stuffing-box chamber and cool the piston-rod, substantially as described.

40. A gas-compressor, in combination with an auxiliary pump, an expansion-coil, a condensing-coil, and intermediate connecting-pipes, and a chamber of the auxiliary pump, through which the piston-rod of the compressor passes, and which chamber has communication with the expansion-coil or a pipe in which the partially-expanded gas is returned to the compressor for recompression, whereby the piston-rod of the compressor is cooled, substantially as described.

41. A gas-compressor, in combination with an expansion-coil, a gas-condenser, and intermediate connecting-pipes, when the said gas-compressor has a piston-rod passing through a chamber communicating with a pipe on the expansion side of the apparatus, and wherein the said piston-rod is cooled by direct contact with the partially-expanded gas, substantially as described.

42. A gas-compressor having inlets constructed and operating to admit a sealing or lubricating liquid to a chamber of the compressor in the form of spray or jets, in combination with a liquid-reservoir and connecting-pipes, the whole constructed and operating to circulate the said sealing or lubricating liquid and introduce the same to the compressor without exposure to the atmosphere either prior to or during the act of compression, substantially as described.

43. A double-acting gas-compressor, a liquid-reservoir, a gas-condenser, an expansion-coil, means for introducing a sealing or lubricating liquid within the said compressor during each act of compression and without exposure to the atmosphere, and connecting-pipes, all in combination, substantially as described.

44. The combination, with a double-acting gas-compressor, of a liquid-reservoir, means for introducing a lubricating-liquid into each of the compression-chambers of the said compressor, either prior to or during the act of compression and without exposure to the atmosphere, under a pressure exceeding the pressure of the gas entering the compressor to be compressed, and connecting-pipes, substantially as described.

45. The combination, with a gas-compressor and its discharging-pipe, of a casing, as T, surrounding said pipe and forming a reservoir for collecting the lubricating or sealing liquid, substantially as described.

46. The combination, with a gas-compressor having a liquid-sealed piston-rod, of a reservoir with liquid, connecting-pipes, and means of charging a sealing or lubricating liquid with gas or liquefied gas under a pressure exceeding the pressure of the gas entering the compressor to be compressed, all arranged and operating to inject such sealing or lubricating liquid while so charged with gas and while under such pressure into a chamber of a gas-compressor, substantially as described.

47. The combination, with a gas-compressor, of a means of dissolving a gas in a sealing or lubricating liquid, or charging said liquid with gas or liquefied gas under pressure, when arranged and operating to inject such liquid while under pressure and so charged with gas into the compression-chambers of a gas-compressor, substantially as described.

48. The combination, with a gas-compressor, of a means of dissolving a gas in a sealing or lubricating liquid, or charging said sealing or lubricating liquid with gas or liquefied gas under a pressure in excess of the pressure of the gas entering the compressor to be compressed, when arranged and operating to introduce such sealing or lubricating liquid while under such pressure and so charged with gas or liquefied gas into a gas-compressor which has received its full charge of gas, substantially as described.

In testimony whereof I have hereunto subscribed my name in the presence of two witnesses.

JULIUS J. SUCKERT.

Witnesses:
W. L. BENNEM,
J. E. WARNER.